(12) United States Patent
Hasegawa

(10) Patent No.: US 6,343,497 B2
(45) Date of Patent: Feb. 5, 2002

(54) METHOD OF MANUFACTURING A SPEED GEAR AND AN APPARATUS FOR MANUFACTURING A SPEED GEAR

(75) Inventor: Heiichi Hasegawa, Hikone (JP)

(73) Assignee: Metalart Corporation, Kusatsu (JP)

( * ) Notice: Subject to any disclaimer, the term of this patent is extended or adjusted under 35 U.S.C. 154(b) by 0 days.

(21) Appl. No.: 09/756,781

(22) Filed: Jan. 10, 2001

Related U.S. Application Data

(62) Division of application No. 09/468,089, filed on Dec. 21, 1999, which is a division of application No. 09/058,846, filed on Apr. 13, 1998.

(30) Foreign Application Priority Data

Dec. 26, 1997 (JP) ............................................. 9-367901

(51) Int. Cl.[7] ................................................ B21B 27/00
(52) U.S. Cl. ......................................... 72/102; 72/108
(58) Field of Search .................. 72/102, 108; 29/893.32

(56) References Cited

U.S. PATENT DOCUMENTS

| | | | |
|---|---|---|---|
| 1,491,481 A | | 4/1924 | Huetter |
| 4,045,988 A | * | 9/1977 | Anderson .................... 72/102 |
| 4,938,089 A | | 7/1990 | Ohoka |
| 5,301,528 A | * | 4/1994 | Hofmann et al. ............. 72/108 |
| 5,363,714 A | | 11/1994 | Hoguchi |
| 5,884,527 A | | 3/1999 | Cole et al. |
| 5,930,896 A | * | 8/1999 | Akiyoshi et al. ............. 72/108 |

FOREIGN PATENT DOCUMENTS

| | | |
|---|---|---|
| JP | 63-120958 | 5/1988 |
| JP | 4-366028 | 12/1992 |

OTHER PUBLICATIONS

Gearing–Basic Theory and Its Application, Richard H. Ewert, Sewall GEar Manufacturing Co., pp. 12–13, 1980.
Marks' Standard Handbook for Mechanical Engineers, McGraw–Hill, tenth edition, pp. 13–60, Dec. 1996.

* cited by examiner

*Primary Examiner*—Ed Tolan
(74) *Attorney, Agent, or Firm*—Wenderoth, Lind & Ponack, L.L.P.

(57) ABSTRACT

Speed gear are manufactured by integrally molding, by either hot or warm forging, a speed gear section and a clutch spline section. Teeth of the speed gear in the speed gear section and an involute spline parallel to an axial line of the gear in the clutch spline section are rough formed. The involute spline parallel to the axial line of gear formed on the section of clutch spline is formed, by cold forging, into an involute spline with a back taper having a chamfer at the tip. The teeth of the speed gear formed at the speed gear section are finish formed by forming the speed gear teeth by rolling dies, by cold forging, while turning them around a shaft hole with reference to the clutch spline section forming the involute spline with back taper. A speed gear having a speed gear section and a clutch spline section including speed gear teeth and an involute spline with a back taper having a chamfer at the tip is thereby provided.

6 Claims, 10 Drawing Sheets

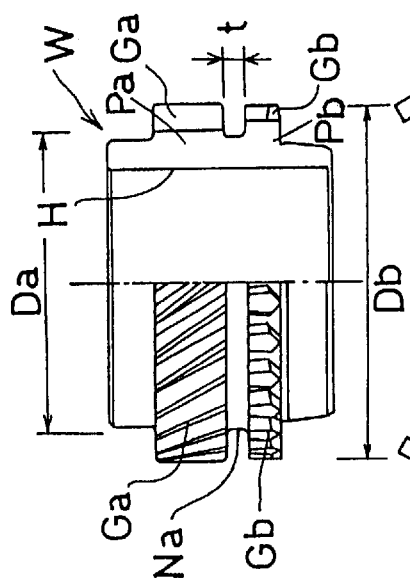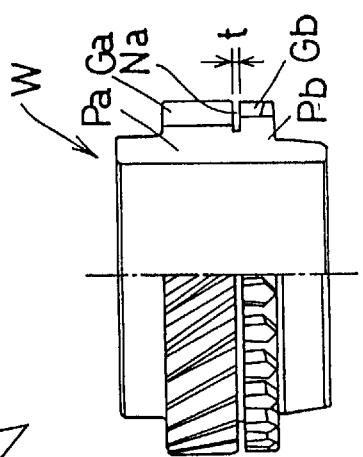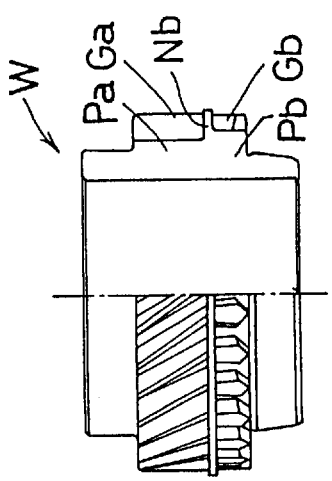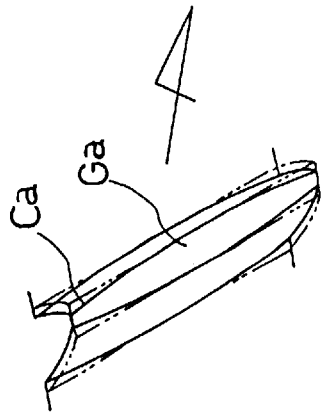
FIG. 10 (A)
FIG. 10 (B)
FIG. 10 (C)
FIG. 10 (D)

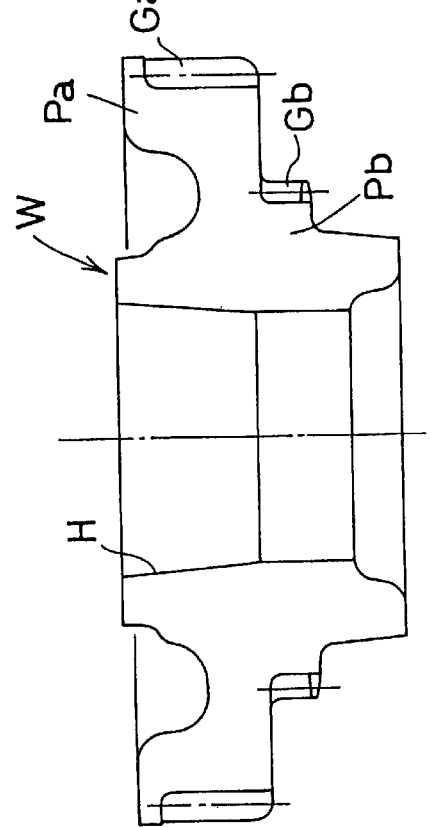
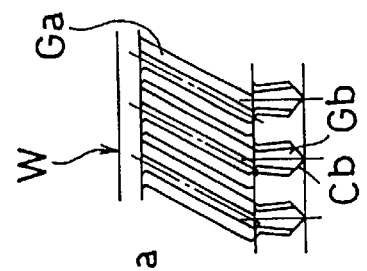
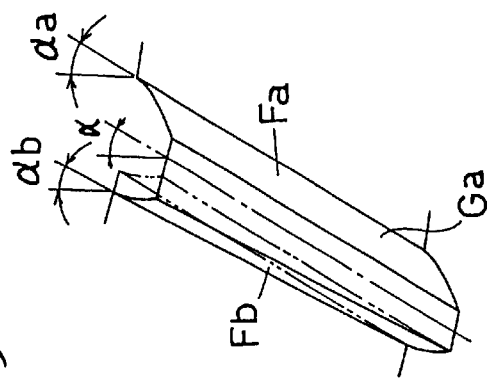
FIG. 11 (A)  FIG. 11 (B)  FIG. 11 (C)

METHOD OF MANUFACTURING A SPEED GEAR AND AN APPARATUS FOR MANUFACTURING A SPEED GEAR

This is a Divisional Application of U.S. patent application Ser. No. 09/468,089 filed Dec. 21, 1999 which in turn is a Divisional Application of U.S. patent application Ser. No. 09/058,846 filed Apr. 13, 1998.

BACKGROUND OF THE INVENTION

The present invention relates to a speed gear having a speed gear section and a clutch spline section mainly used for a transmission gearbox, and a manufacturing method and apparatus for the speed gear.

Conventionally, a speed gear having a speed gear section and a clutch spline section used for a transmission gearbox is manufactured by methods such as:

1. A method which comprises forming a speed gear section and spline teeth respectively by submitting a speed gear section and a clutch spline section, integrally molded by hot forging, to machining such as hobbing, etc;
2. A method which comprises forming a speed gear section by submitting a speed gear section molded by hot forging to machining such as hobbing, etc., and integrating the speed gear section and a clutch spline section having spline teeth molded by cold forging by either spline connection or electron beam welding; and
3. A method which comprises forming a speed gear section by submitting a speed gear section and a clutch spline section integrally molded by hot forging to machining such as hobbing, etc. and forming a clutch spline section by hot forging and cold forging, respectively.

By the way, methods 1 to 3 all consist in forming the speed gear section by submitting the speed gear section to machining such as hobbing, etc. For that reason, they had a problem in that the metal flow of the section of speed gear was cut off, not only reducing the strength of the gear but also inevitably leading to an increase of the manufacturing cost due to machining.

As a solution to this problem, adoption of a method for forming speed gear teeth in the speed gear section by cold forging with a press may be conceivable, but no high-accuracy speed gear section could be manufactured because of the difficulty of securing concentricity between the clutch spline section and the speed gear section forming speed gear teeth.

Moreover, a speed gear W generally used for the transmission gearbox at present is provided, as shown in FIG. 11, with speed gear section Pa and clutch spline section Pb, forming helical teeth Ga as speed gear teeth at the speed gear section Pa and an involute spline with a back taper Gb having a chamfer Cb at the tip of the clutch spline section Pb, respectively.

The helical teeth Ga formed at the speed gear section Pa generally have, as shown in FIG. 10 (C), a torsional angle α of 15° to 35° on the right or on the left, and are formed as high teeth to reduce the gear noise produced during high-speed rotation of the speed gear W.

For that reason, in the case where an attempt is made to form helical teeth Ga by cold forging with a press, for example, the greater part of the forming pressure must be supported by the tooth flank Fa of the helical teeth Ga. This causes deflection of the helical teeth Ga, producing a gap in the tooth flank Fb and inducing the material to flow into that gap.

As a result, the helical teeth Ga are formed differently at the torsional angle α of the tooth flank Fa and the torsional angle α b of the tooth flank Fb, making it difficult to manufacture a speed gear of high accuracy. In addition, since this trend becomes particularly conspicuous as the torsional angle a gets larger, it was impossible to form helical teeth Ga with a torsional angle a of 30° or more by cold forging with a press.

Furthermore, as the speed gear W, a type forming helical teeth Ga having crowning Ca on the tooth flank (see FIG. 10 (D)) at the speed gear section Pa was also adopted. But this crowning could not be formed by cold forging with a press.

SUMMARY OF THE INVENTION

In view of the problems inherent in conventional speed gears and their manufacturing methods, the object of the present invention is to provide a speed gear having a speed gear section and a clutch spline section including speed gear teeth and an involute spline with a back taper having a chamfer at the tip, and a manufacturing method and apparatus for the speed gear.

To achieve the objective, the speed gear according to the present invention has a speed gear section and a clutch spline section integrally formed by forging. The clutch spline section is provided with an involute spline with a back taper having a chamfer at the tip. Speed gear teeth are formed by forging with rolling dies at the speed gear section with reference to the clutch spline section forming the involute spline with a back taper.

The speed gear forming the subject of the present invention includes a speed gear having helical teeth or flat teeth as the teeth of the speed gear.

Moreover, the speed gear forming the subject of the present invention also includes a speed gear having crowning on the tooth flank.

Furthermore, the speed gear forming the subject of the present invention further includes a speed gear in which the tip diameter of the back tapered involute spline formed on the clutch spline section is larger than the root diameter of the speed gear teeth formed on the speed gear section and the clearance between the speed gear section and the clutch spline section is no more than 2 mm.

Further, the speed gear forming the subject of the present invention includes a speed gear in which an involute spline with a back taper is formed in a shape conformable to the tip shape of dies by pushing in the dies, radially disposed against the axial line of the gear among spline teeth parallel to the axial line of the gear formed by forging, toward the center of gear in a direction perpendicular to the axial line of the gear.

The manufacturing method of the speed gear according to the present invention comprises integral molding, by either hot or warm forging, the speed gear section and the clutch spline section, rough-forming speed gear teeth in the speed gear section and involute splines parallel to the axial line of the gear in the clutch spline section, forming the involute splines parallel to the axial line of the gear formed on the clutch spline section by cold forging into an involute spline with a back taper having a chamfer at the tip, and then finish forming the speed gear teeth formed at the speed gear section. The finish forming of the speed gear teeth is done by forming the speed gear teeth by rolling dies, by cold forging, while turning them around a shaft hole located with reference to the clutch spline section forming the involute spline with a back taper.

In this case, the manufacturing method may be constructed in a way to form crowning on the tooth flank of the speed gear teeth by means of rolling dies.

Moreover, the forming of an involute spline with a back taper may be performed by pushing in dies, radially disposed against the axial line of the gear among spline teeth parallel to the axial line of the gear formed at the clutch spline section, toward the center of the gear in the direction perpendicular to the axial line of the gear, in a shape conformable to the tip shape of the dies.

The manufacturing apparatus of the speed gear according to the present invention, relating to the method of the present invention, comprises a chuck for holding the shaft hole at the center of the work gear, a tail stock for turning the work gear through the chuck around its shaft hole, a synchronizing gear disposed in the tail stock that turns together with the tail stock, a driven gear engaging with the synchronizing gear, and a rolling spindle on which are disclosed rolling dies. The work gear is submitted to finish forming of the rough-formed speed gear teeth by the rolling dies turning in synchronization with the work gear while turning the work gear around its shaft hole through the synchronizing gear and the driven gear.

In this case, the chuck may comprise a collet chuck and a male cone to be inserted in the collet chuck so as to expand the diameter of the collet chuck and hold the shaft hole at the center of the work gear.

Moreover, the rolling dies may be constructed to perform finish forming of helical rough-formed teeth.

Furthermore, the rolling dies may be constructed to also perform crowning at the tooth flank of the rough-formed speed gear teeth.

According to the present invention, it becomes possible to integrally form, by forging, the speed gear section and the clutch spline section including speed gear teeth and an involute spline with a back taper having a chamfer at the tip, thus providing the following actions and effects.

1. By forming speed change gear teeth and an involute spline with a back taper having a chamfer at the tip by forging, it becomes possible to improve the strength of the gear without cutting the metal flow of the teeth, avoiding an increase in manufacturing cost due to machining, and reducing the manufacturing cost of the speed gear.
2. It is easy to concentrically secure the clutch spline section forming an involute spline with a back taper with the speed gear section forming speed gear teeth, enabling the manufacture of a highly-accurate speed gear.
3. When forming helical teeth as speed gear teeth, it is possible to manufacture a highly-accurate speed gear, especially helical teeth with a torsional angle of 30° or more, by forging.
4. When forming speed gear teeth by forging, it is possible to also perform crowning at the tooth flank of the speed gear teeth at the same time.
5. By forming an involute spline with a back taper having a chamfer at the tip by forging, it becomes possible to not only manufacture a highly-accurate speed gear without hooking due to machining, but to also obtain a speed gear with excellent shift feeling.
6. The absence of restrictions on the component materials of the speed gear enables the use of high-strength, difficult to cut steel, making it possible to manufacture a compact speed gear easily.
7. It is possible to manufacture a speed gear with a shape difficult to achieve through machining, and obtain a compact speed gear.

BRIEF DESCRIPTION OF THE DRAWINGS

FIGS. 10(A)–10(D) are explanatory drawings of various kinds of speed gears.

FIGS. 11(A)–11(C) show a typical speed gear, 11(A) being a sectional view, 11(B) an exploded view of a main part, and 11(C) an expanded explanatory drawing of teeth of the speed gear.

DETAILED DESCRIPTION OF THE INVENTION

Explanation will be given hereafter of an embodiment of a speed gear, a manufacturing method and an apparatus according to the present invention, based on the drawings.

First, a method for forming the speed gear of the present invention will be explained by using FIG. 1, which concerns a case of forming of a speed gear W of a shape as indicated in FIGS. 11(A) and 11(B).

Figure 1:
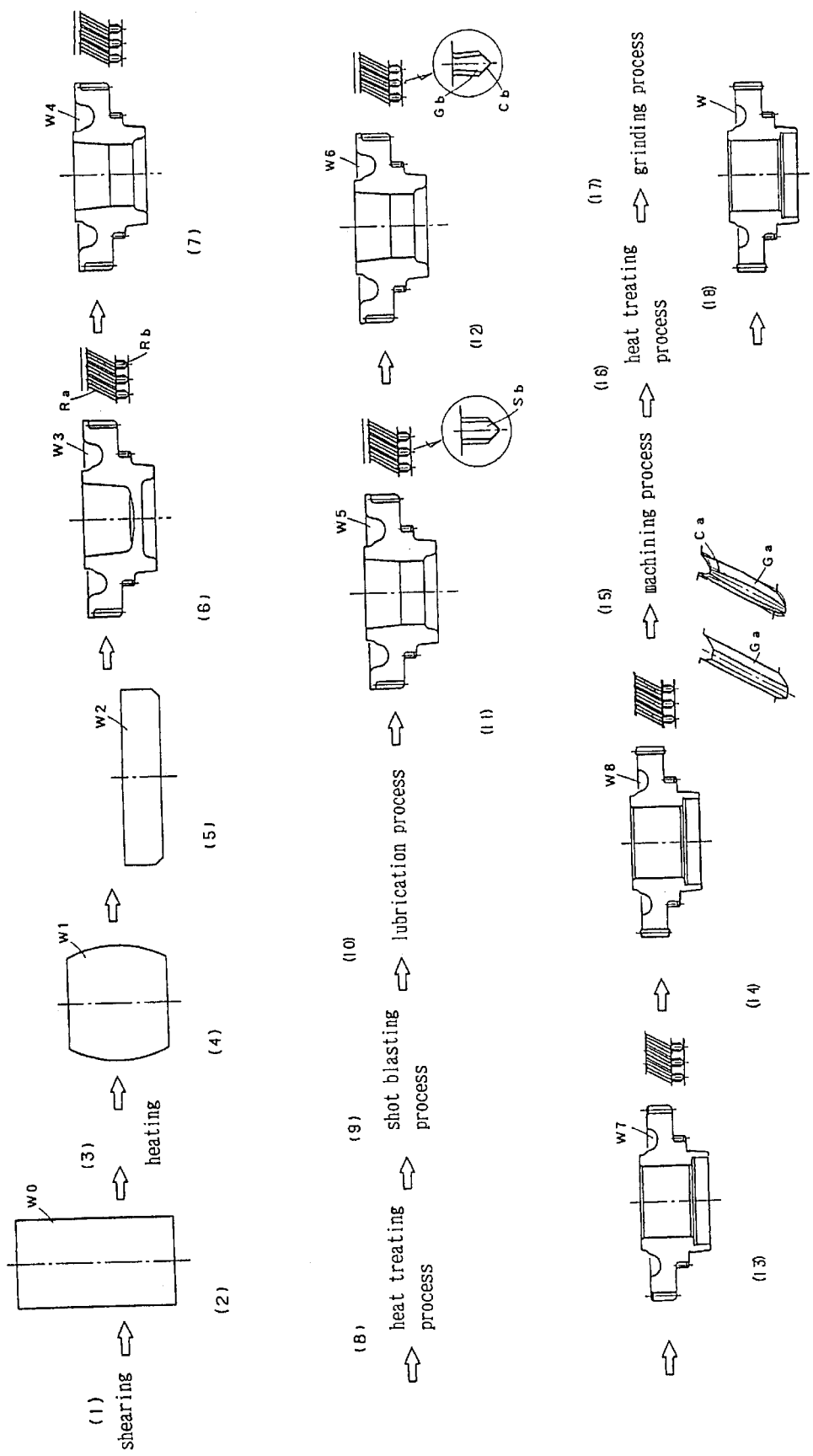
FIG. 1 is an explanatory drawing showing a manufacturing process of a speed gear according to the present invention.

First, a raw material suitable for the speed gear W to be manufactured is cut to a prescribed length by means of a billet shear or a saw (FIG. 1 (1), (2)). This raw material W0 is heated to a temperature suitable for either hot or warm forging (FIG. 1 (3)).

In this case, materials suitable for the speed gear W, such as SC steel, SCM steel, SNC steel, SNCM steel, SCR steel, etc., may be used as the raw material.

Moreover, the heating temperature may be set depending on the type of forging (hot or warm), the nature of the material, the shape, size, etc., at 1150° C. to 1200° C., for example.

After heating, the raw material W0 is submitted to a plural number of processes to integrally form a speed gear section Pa and a clutch spline section Pb and to form an intermediate product W4 having rough-formed speed gear teeth Ra at the speed gear section Pa and rough-formed involute spline Rb at the clutch spline section Pb parallel to the axial line of the gear.

This hot forging process is usually composed, though not particularly restricted to such composition, of four processes, i.e. an upsetting process (FIG. 1 (4)), a blocker process (FIG. 1 (5)), a finisher process (FIG. 1 (6)) and a piercing process (FIG. 1 (7)).

Among those processes, the upsetting process (FIG. 1 (4)) is a process for forming the raw material W0 into a shape easy for forging. The material W1 which has passed through this process is submitted to the blocker process (FIG. 1 (5)) and the finisher process (FIG. 1 (6)), to be described in detail later) to be adjusted into the required general shape and to have the required teeth rough-formed on the speed gear section Pa and the clutch spline section Pb.

The blocker process (FIG. 1 (5)) and the finisher process (FIG. 1 (6)) may be further composed of a plural number of processes, depending on the nature of the material W1, the shape and size of the intermediate product W1 to be formed, etc.

The intermediate product W4 realized by forming a shaft hole H at the center of the intermediate product W3 is obtained with the piercing process (FIG. 1 (7)). The diameter of the shaft hole H is formed to be slightly smaller than the final finished dimension.

The intermediate product W4, having the required teeth rough-formed on the speed gear section Pa and the clutch spline section Pb, are submitted, in a heat treating process (FIG. 1 (8)), to heat treatment such as annealing, etc. In a shot blasting process (FIG. 1 (9)), scale adhering to the surface of the intermediate product W4 is removed. In a lubrication process (FIG. 1 (10)), required lubrication such as a bonderite process, treatment by a molybdenum disulfide based lubricant, etc. will be performed to ensure smooth execution of the subsequent cold forging process.

The intermediate product W4 which has passed through the lubrication process (FIG. 1 (10)) will be submitted, in a cold coining process (FIG. 1 (11)), to finish forming of involute spline Rb. Then, in an involute spline forming process (FIG. 1 (12), to be described in detail later), an involute spline Sb, parallel to the axial line of the gear and formed at the clutch spline section Pb, will be formed from the involute spline Rb in a back tapered shape.

The intermediate product W6 which passed through the involute spline forming process (FIG. 1 (12)) will be submitted, in a machining process (FIG. 1 (13)), to lathe turning of the end face of the intermediate product W6, the inner circumferential surface of the shaft hole H and other parts, with reference to the clutch spline section Pb having involute splines with back taper Gb formed with final finished dimensions.

The intermediate product W7 which passed through the machining process (FIG. 1 (13)) will be passed on to a speed gear teeth forming process (FIG. 1 (14), to be described in detail later), where the speed gear teeth Ra formed at the speed gear section Pa are finish formed into speed gear teeth while turning around the shaft hole H.

At that time, crowing Ca may be formed on the tooth flank of the speed gear teeth Ra.

The intermediate product W8 which passed through the speed gear teeth forming process (FIG. 1 (14)) will be submitted, in the machining process (FIG. 1 (15)), to lathe turning of the outer circumference, end face and other parts of the speed gear section Pa. Then, in a heat treating process (FIG. 1 (16)), required heat treatments such as carbo-hardening, tempering, etc. are carried out. By further passing the intermediate product W8 through the grinding process (FIG. 1 (17)), speed gear W as a final product results.

Next, the finisher process (FIG. 1 (6)) will be described in detail.

The finisher process consists in integrally forming the speed gear section Pa and the involute spline with back taper Pb on the intermediate product W2, provided in the required general shape by the blocker process (FIG. 1 (5)) of either a hot or warm forging process, rough-forming speed gear teeth Ra at the speed gear section Pa and rough forming involute spline Rb parallel to the axial line of the gear at the involute spline with back taper.

Figure 2:
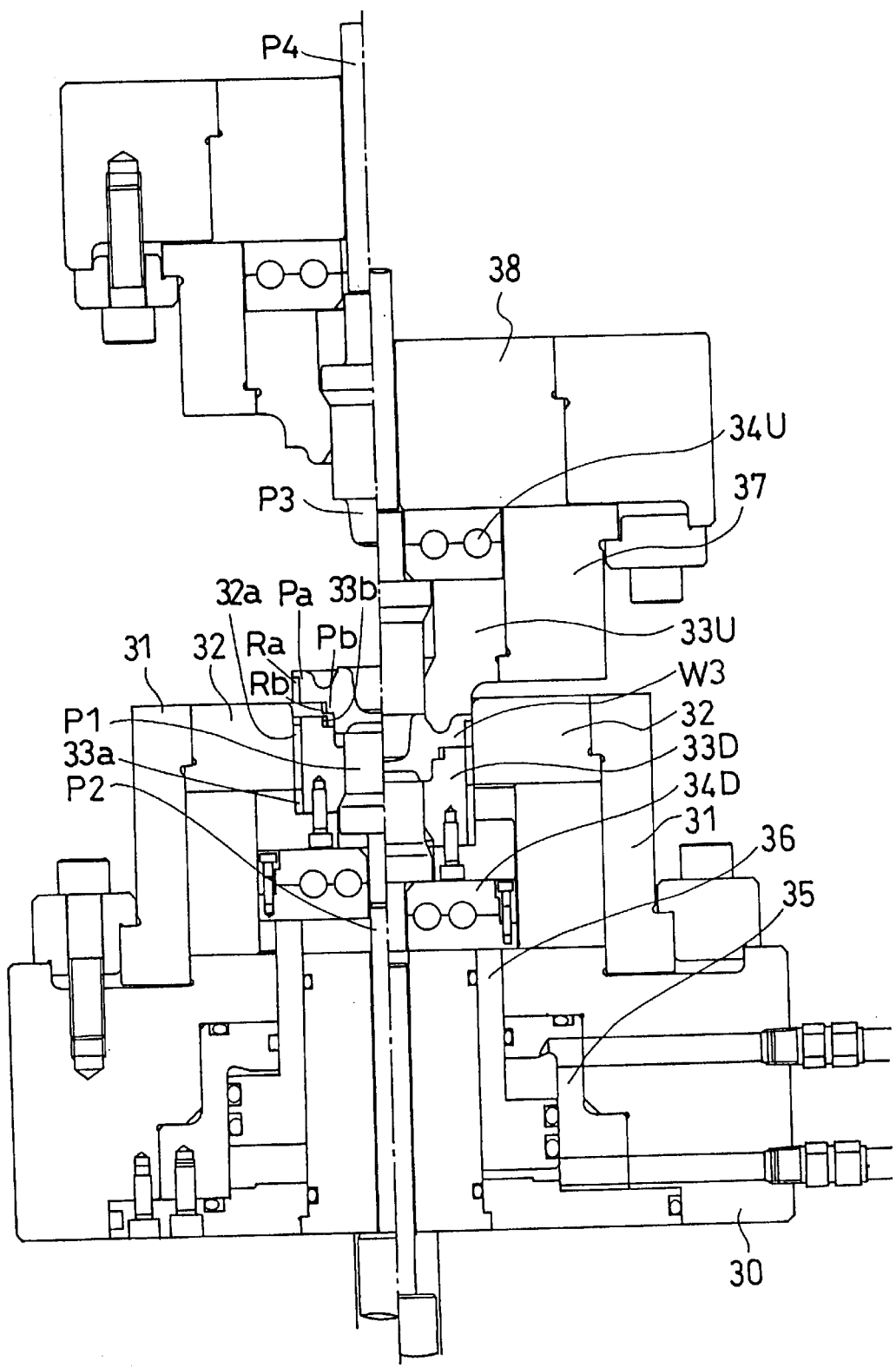
FIG. 2 is a front sectional view of an apparatus for rough-forming a gear used in the manufacture of the speed gear according to the present invention.

FIG. 2 indicates an example of an apparatus for rough-forming gear used for executing this finisher process.

This apparatus for rough-forming gear is designed to simultaneously rough-form helical teeth Ra as speed gear teeth at the speed gear section Pa and involute spline Rb parallel to the axial line of the gear at the clutch spline section Pb. Its structure will be explained hereafter.

A die mounting stand 31 is attached on a base 30, and a die 32 for forming gear is mounted on this die mounting stand 31.

The die 32, formed in a cylindrical shape, is provided, at its inner circumferential surface, with forming teeth 32a corresponding to the helical teeth Ra to be formed at the speed gear section Pa of the intermediate product W2.

Moreover, in the die 32 will be inserted, from above and below respectively, an upper punch 33 U and a lower punch 33 D, which produce plastic deformation by holding and pressing the intermediate product W2 from above and below. In this case, the die 32 will be constructed in such a way that, as the forming teeth 32a of the die 32 and driven teeth 33a formed at the outer circumference of the lower punch 33D engage with each other and the lower punch 33D moves in the die 32, the lower punch 33D turns according to that amount of movement.

The upper and lower punches 33U, 33D are formed in a shape capable of forming the intermediate product W2 into the intermediate product W3 by producing plastic deformation in the intermediate product W2 in collaboration with the die 32. The lower punch 33D is further provided, at its inner circumferential surface at the top, with forming teeth 33b corresponding to the involute spline Rb parallel to the axial line of the gear to be formed at the clutch spline section Pa of the intermediate product W2.

The upper and lower punches 33U, 33D are rotatably supported through upper and lower bearing plates 34U, 34D. The upper punch 33U is made to go up and down by means of a lifter 38 through upper punch mounting base 37 while the lower punch 33D is made to go up and down by means of a piston 36 moving as hydraulic operating fluid is fed into a hydraulic cylinder 35.

The lower punch 33D, in which a lower knockout pin P1 is inserted, is operated by a knockout pin P2 passing through the base 30, while the upper punch 33U, in which upper knockout pin P3 is inserted, is operated by knockout pin P4 passing through the lifter 38.

Next, explanation will be given of the motions of this apparatus for rough-forming gear.

The intermediate product W2 is placed on the lower punch 33D and, as the lifter 38 is made to come down, the intermediate product W2 is held and pressed between the upper punch 33U and the lower punch 33D to produce plastic deformation, and rough-form helical teeth Rb at the speed gear section Pa and involute spline Rb parallel to the axial line of the gear at the clutch spline section Pb at one time.

After that, hydraulic operating fluid is supplied into the hydraulic cylinder 35 to make the piston 36 go up and push up the lower punch 33D. In this case, the piston 36 is made to go up until the formed intermediate product W3 is detached from the gear die 32.

At that time, as the lower punch 33D moves in the gear die 32, the lower punch 33D turns in proportion to the amount of that movement, and the formed intermediate product W3 also turns at the same time, because the forming teeth 32a of the gear die 32 are engaged with the driven teeth 33a formed on the outer circumferential surface of the lower punch 33D. This makes it possible to take out the intermediate product W3 without causing damage to the helical teeth Ra and the involute spline Rb parallel to the axial line of the gear formed respectively at the speed gear section Pa and the clutch spline section Pb of the intermediate product W3.

To take out the intermediate product W3, the lifter 38 is made to up to release the holding of the intermediate product W3 by the upper punch 33U and the lower punch 33D. Then the piston 36 of the hydraulic cylinder 35 is made to go up to detach the helical teeth Ra formed at the section of speed gear Pa of the intermediate product W3 from the forming teeth 32a of the gear die 32. After that, the lower knockout pin P1 is made to protrude by the knockout pin P2, and the upper knockout pin P3 is made to protrude by the knockout pin P4, to detach the involute spline Rb from the forming teeth 33b of the lower punch 33D and release the intermediate product W3 from the upper and lower punches 33U, 33D.

Next, the involute spline forming process of FIG. 1 (12) will be explained in detail.

The involute spline forming process consists in performing, in the cold coining process (FIG. 1 (11)), finish forming of the involute spline Rb parallel to the axial line of the gear rough-formed at the clutch spline section Pb, and then forming, on intermediate product W5, the involute spline parallel to the axial line of the gear formed at the clutch spline section Pb into the involute spline with back taper Gb.

Figure 3:
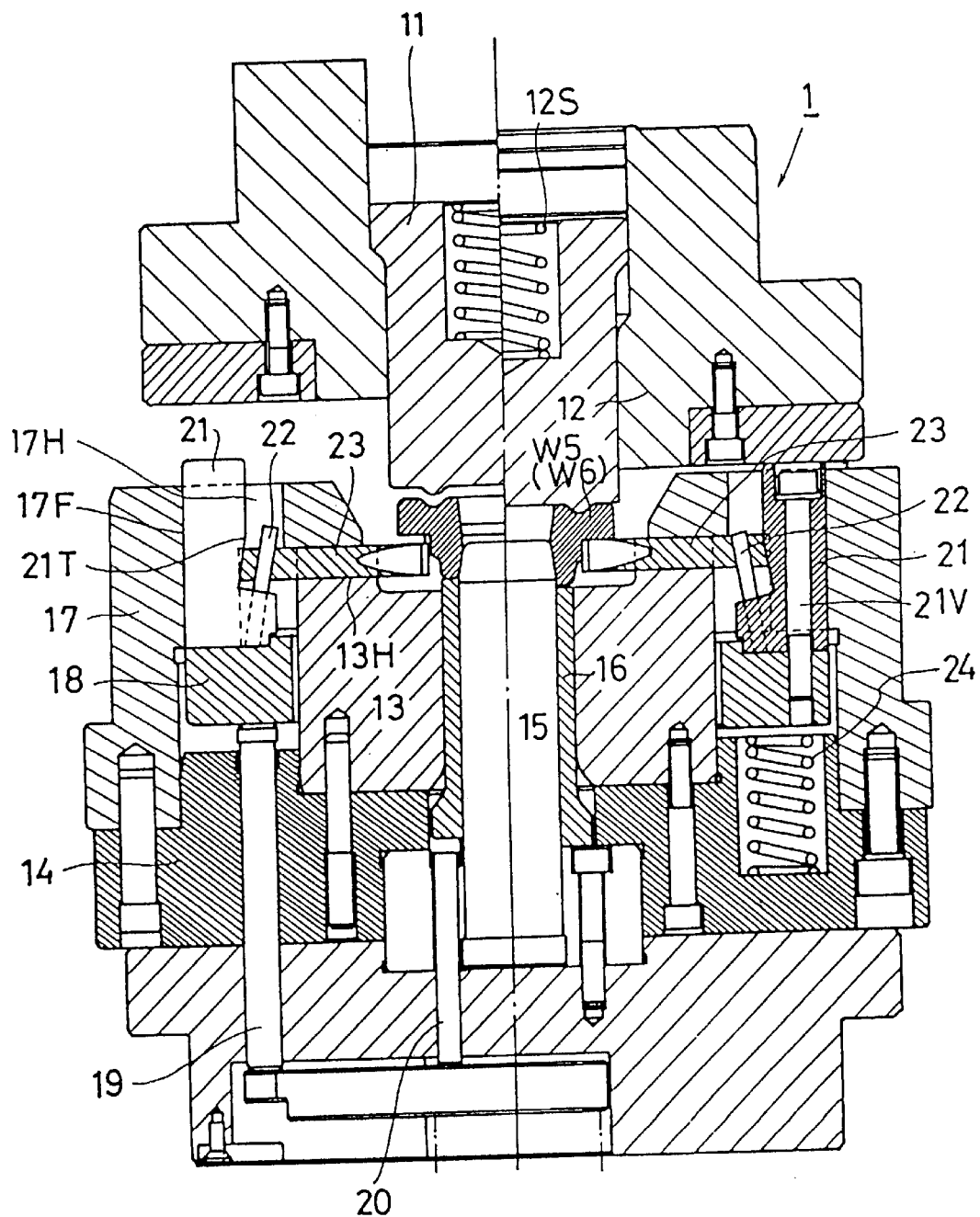
FIG. 3 is a front sectional view of an apparatus for forming an involute shape used in the manufacture of the speed gear according to the present invention.
Figure 4:
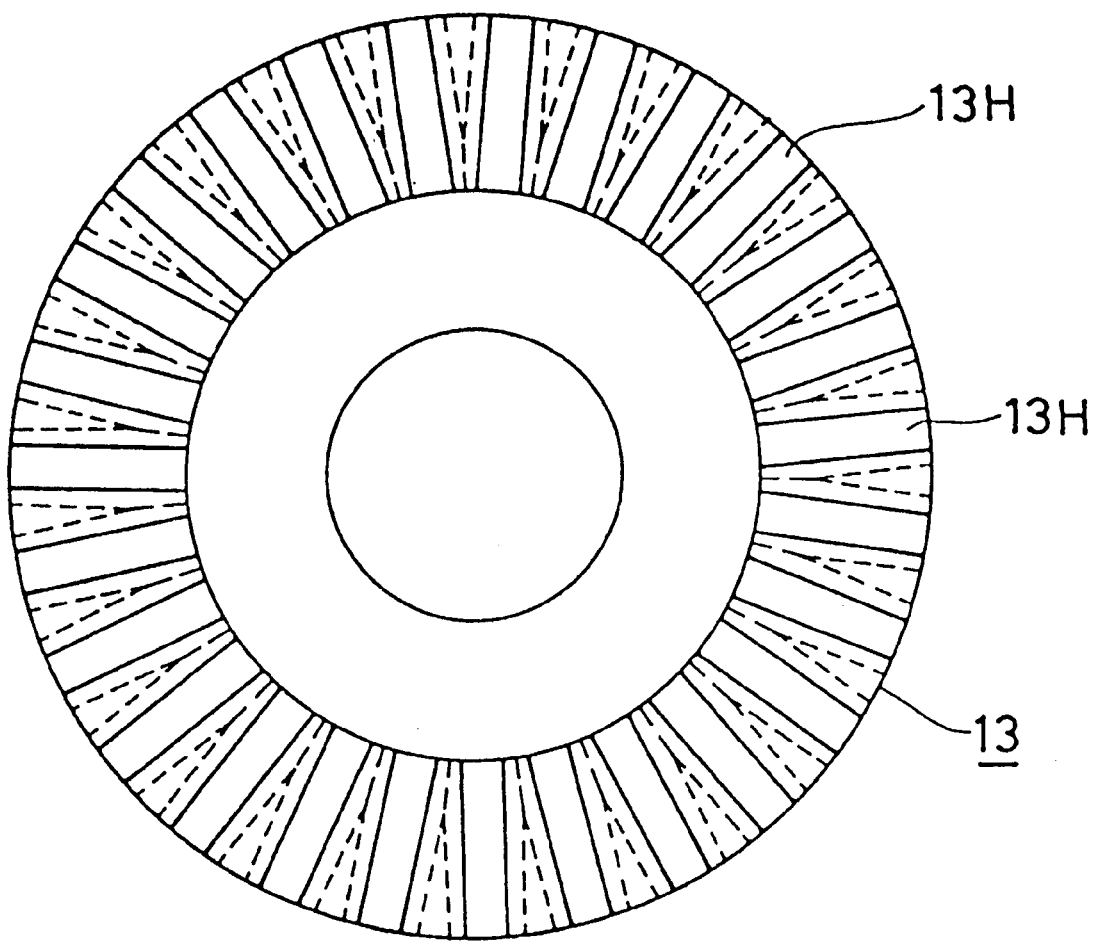
FIGS. 4(A) and 4(B) show a lower die of the apparatus for forming an involute shape, 4(A) being a plan view, and 4(B) a front elevation of a main part.
Figure 4:
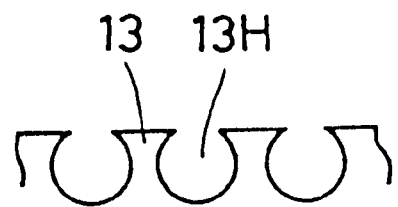
Figure 5:
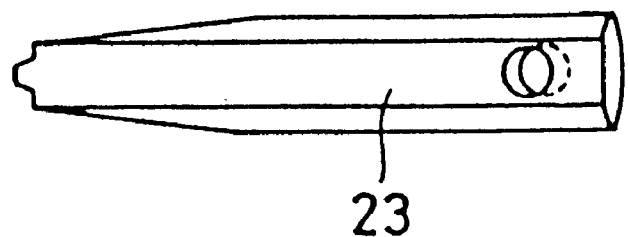
FIGS. 5 show dies of the apparatus for forming an involute shape, 5(A) being a plan view, 5(B) a partially broken front elevation, and 5(C) an explanatory drawing of a die tip.
Figure 5:
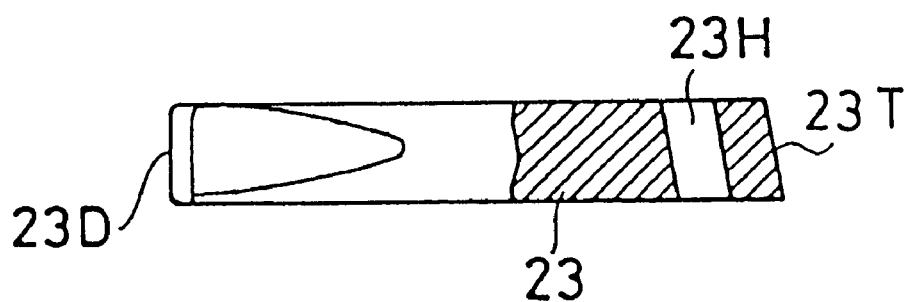
Figure 5:
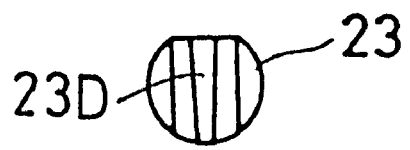
Figure 6:
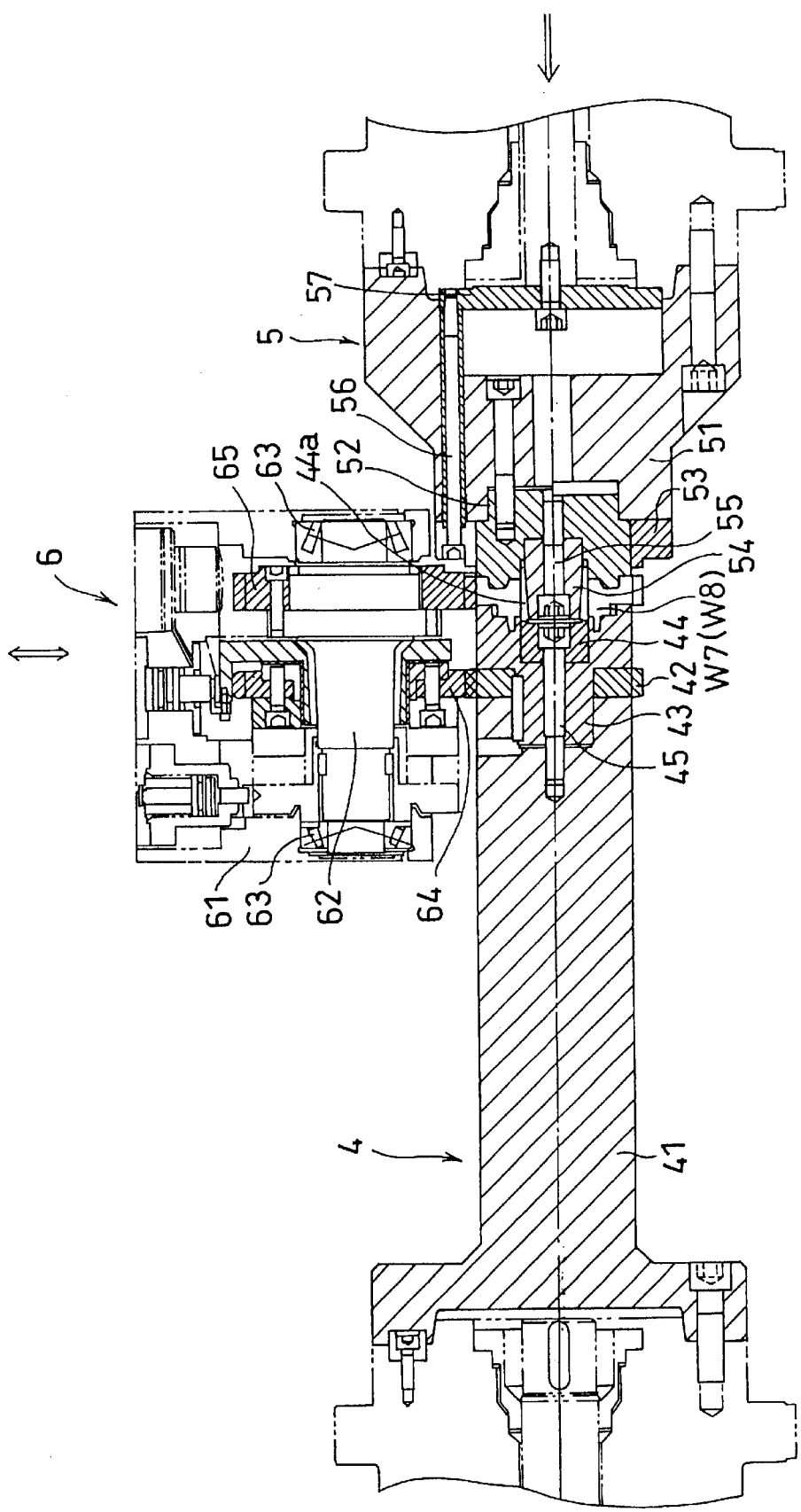
FIG. 6 is a front sectional view of a flow forming apparatus used for the manufacture of the speed gear according to the present invention.
Figure 7:
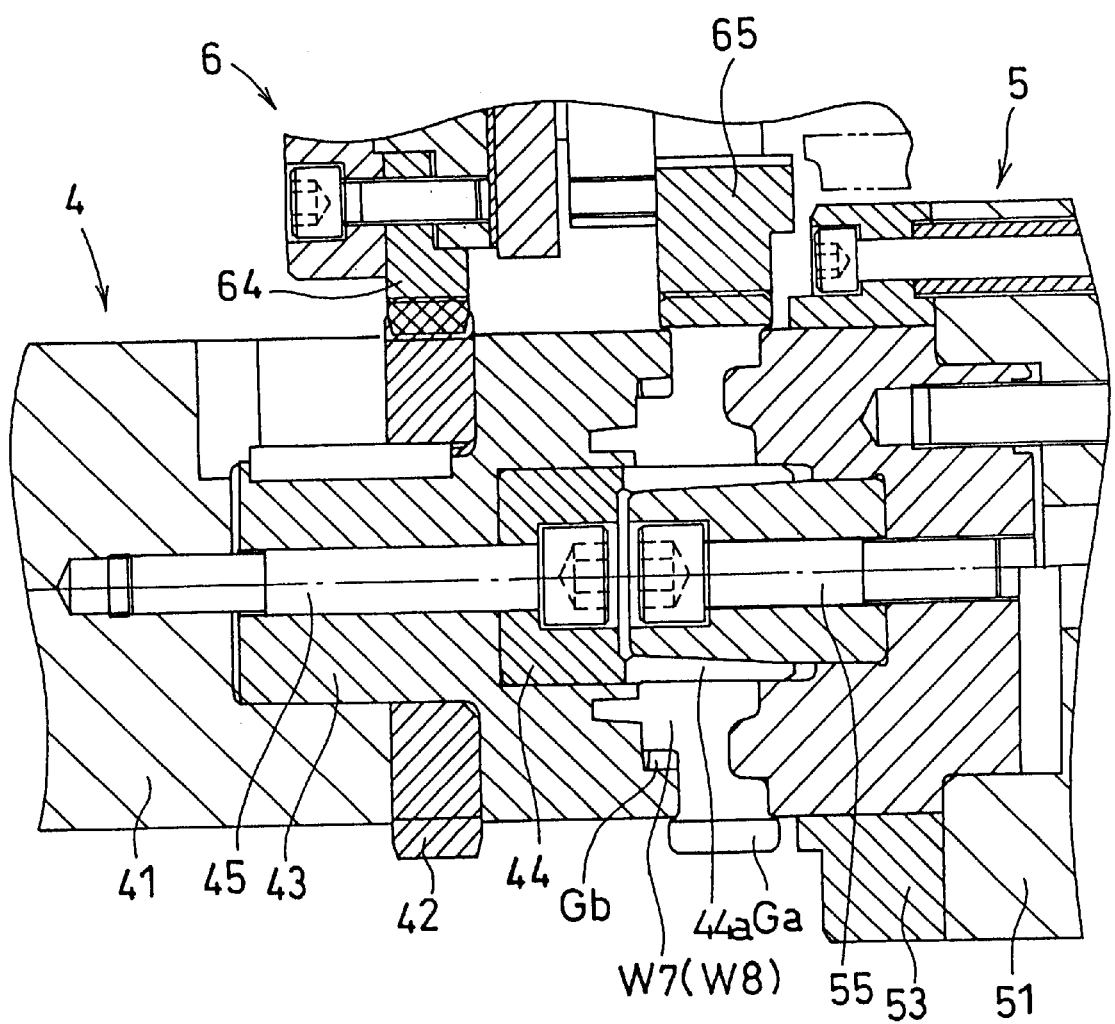
FIG. 7 is an expanded view of a main part of the flow forming apparatus.
Figure 8:
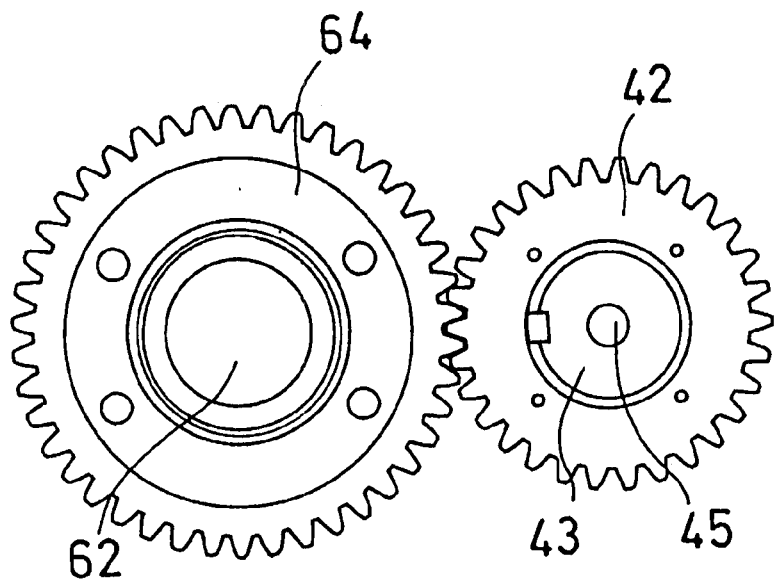
FIG. 8 is an explanatory drawing showing the relation between a synchronizing gear and a driven gear.
Figure 9:
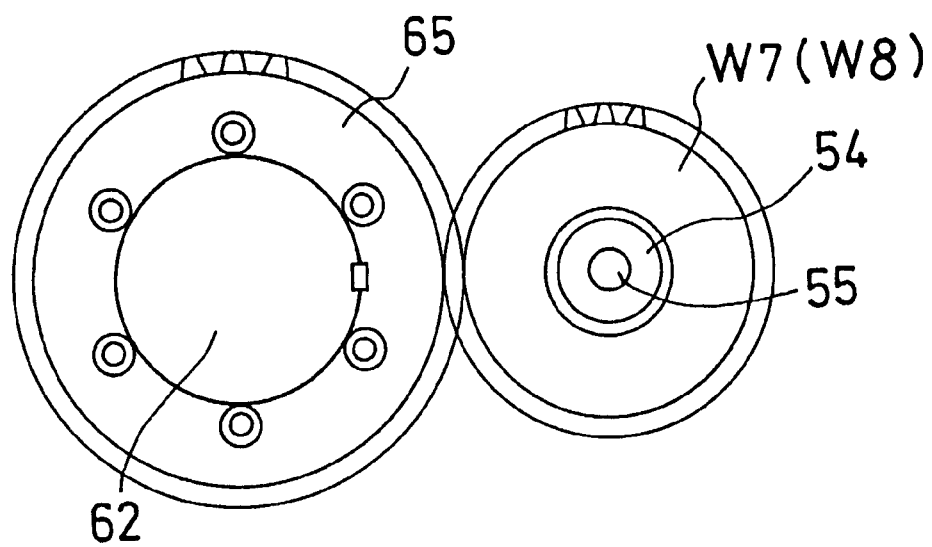
FIG. 9 is an explanatory drawing showing the relation between rolling dies and an intermediate product.

FIG. 3 to FIG. 5 indicate an example of an apparatus for forming the involute spline used for this forming process.

An apparatus for forming an involute spline 1, designed to form an involute spline parallel to the axial line of the gear formed at the clutch spline section Pb into an involute spline with back taper Gb, is constructed as explained hereafter.

An upper die 11 is disposed on an upper die mounting base 12 so as to be urged downwardly by a spring 12A.

A lower die 13 opposed to the upper die 11 is fixed on a lower die mounting base 14. A punch 15 is disposed on the lower die mounting base 14 through the lower die 13. Outside the punch 15 is disposed a knockout cylinder 16 of a cylindrical shape and operated with a knockout pin 20. A cylindrical case 17 is fixed to the lower die mounting base 14. On the case 17 are formed, at a prescribed pitch, cam inserting holes 17H agreeing with the angle between teeth and the number of teeth of the involute spline Gb for forming the involute spline Sb into the involute spline with back taper Gb. The outer side faces of these cam inserting holes 17H are formed into cam supporting faces 17F. Cams 21 are inserted in the cam inserting holes 17H, respectively.

The cams 21 inserted in cam inserting holes 17H are supported on the lower die mounting base 14 through a spring 24, being supported by a circular flange 18 operated by a knockout pin 19, and fixed to this circular flange 18 by means of a bolt 21V.

The length of a knockout pin 19 and the knockout pin 20 are set in such a way that the knockout pin 20 pushes up the knockout cylinder 16 after the knockout pin 19 has pushed up the flange 18.

The cam 21, the back face of which is finished with high accuracy to be in sliding contact with the cam supporting face 17F of the case 17, has a pin 22 on the inner side at its lower part projecting such that a top end of the pin 22 inclines inwardly. A die pressing face 21T has a tilt angle equal to the inclination of the pin 22 and is formed on the inner side face, facing the pin 22.

At the top of the lower die 13 are formed, as shown in FIG. 4, die inserting holes 13H agreeing with the angle between teeth and the number of teeth of the involute spline with back taper Gb, toward the center of the lower die 13.

The die inserting holes 13H have sections that are about circular and tops cut in a plane. In these die inserting holes 13H are inserted dies 23 having sections that are about circular and having tops cut in a plane. This enables a construction in which the dies 23 are radially disposed toward the center of the lower die 13 while the case 17 supports the flat part of the dies 23 to prevent turning of the dies 23.

A tip 23D of the die 23 is pressed against the involute spline Sb parallel to the axial line of the gear formed at the clutch spline section Pb, producing plastic deformation, and thus changing the shape into a shape available for formation into the involute spline with back taper. Moreover, in the die 23 is drilled a pin inserting hole 23H for inserting the pin 22. The rear end face 23T of the die 23 is formed into an inclined face corresponding to the die pressing face 21T of the cam 21.

Next, explanation will be given on the motions of this apparatus 1 for forming the involute spline.

The intermediate product W5 is placed on the lower die 13. As the upper die mounting base 12 is made to come down, the intermediate product W5 is held between the upper die 11 urged by the spring 12S and the lower die 13. The top face of the cam 21 is pressed by the upper die mounting base 12, with a slight delay after the holding of the intermediate product W5.

As a result, the cam 21 and the flange 18 are pushed down, and the rear end face 23T of the die 23 is pressed by the die pressing face 21T of the cam 21 while the respective dies 23 slide in the direction toward the center of the lower die 13, namely in the axial direction of the intermediate product W5. The involute splines Sb parallel to the axial line of the gear formed at the clutch spline section Pb are then formed into involute splines with back taper Gb by the tips 23D of the dies 23.

After that, the upper die mounting base 12 is made to go up, to push up the knockout pin 19 and make the flange 18 go up. This also makes the cam 21 go up but, since the pin 22 provided in projection with an inclination against the cam 21 is inserted in the pin inserting hole 23H of the die 23, the respective dies 23 forcibly slide in the direction opposite to the center of the lower die 13, and the tip 23D of the die 23 is detached from the intermediate product W6 on which is formed the involute spline with back taper Gb.

To take out the intermediate product W6, the tip 23D of the die 23, after being detached from the intermediate product W6 so that the involute spline with back taper Gb is not damaged by the tip 23D of the die 23, pushes down the knockout pin 20 and makes the knockout cylinder 16 protrude, thus releasing the intermediate product W6 from the lower die 13.

Next, the speed gear teeth forming process by the flow forming of FIG. 1 (14) will be explained in detail.

The speed gear teeth forming process by flow forming consists in finish performing, with the involute spline forming process of FIG. 1 (12), speed gear teeth Ra rough-formed at the speed gear section Pa into speed gear teeth Ga, while rotating the intermediate product W7 around the shaft hole H, with reference to the clutch spline section Pb having involute spline with back taper Gb formed in the final finished dimensions.

FIG. 6 to FIG. 9 show an example of the apparatus for flow forming used for executing the speed gear teeth forming process by flow forming.

An apparatus for flow forming 7, intended to finish form helical teeth Ra into helical teeth Ga, is constructed as described below.

The apparatus for flow forming 7 is composed of a tail stock unit 4 alternately rotatable in normal and reverse directions, a chuck unit 5 for holding the intermediate product W7 in collaboration with the tail stock unit 4, and a rolling die unit 6 driven by the rotation of the tail stock unit 4 for finish forming helical teeth Ra into helical teeth Ga.

The tail stock unit 4 is constructed by fixing a synchronizing gear 42, a receiving die 43 and a collet chuck 44 by means of a bolt 45 to the tip of the tail stock 41, which is alternately rotatable in normal and reverse directions.

The synchronizing gear 42 has teeth which protrude more than the tail stock 41. The teeth are in phase with the helical teeth Ga to be formed.

On the receiving die 43 is formed a concave part in the shape of an involute spline corresponding to the involute spline with back taper Gb formed at the clutch spline section Pb of the intermediate product W7.

The chuck unit 5 is constructed by fixing a clamp die 52 and a male cone 54 to a chuck receiving base 51, disposed to face the tail stock unit 4 with a bolt 55. A stripper 53 disposed at the outer circumference of the clamp die 52 is fastened to a rod 56.

As the chuck unit 5 is made to advance, the receiving die 43 of the tail stock unit 4, disposed face to face with the chuck unit 5, and the clamp die 52 of the chuck unit 5 hold the intermediate product W7 by engaging the involute spline with back taper Gb formed at the clutch spline section Pb of the intermediate product W7 in the concave part in the shape of an involute spline formed in the receiving die 43. This puts the helical teeth Ra in phase with the synchronizing gear 42.

Moreover, the intermediate product W7 is held accurately around the shaft hold H of the intermediate product W7, because it is held as the male cone 54 of the chuck unit 5 is inserted in the collet chuck 44 of the tail stock unit 4, thus flaring a claw segment 44a of the collet chuck 44.

Furthermore, the stripper 53 is slidably disposed at the outer circumference of the clamp die 52 fixed to the chuck receiving base 51 and fastened to the tip of the rod 56 passing through the chuck receiving base 51 to slidably support a mounting base 57, to which the base end of the rod 56 is fixed, in the axial direction of the chuck receiving base 51.

The chuck unit 5 is constructed so as to release, after formation of the helical teeth Ga, the holding of the intermediate product W8 by the receiving die 43 and the clamp die 52 by making the chuck receiving base 51 retreat by making the stripper 53 protrude by means of the rod 56.

The rolling die unit 6 is constructed of a movable carriage 61 which traverses against the tail stock 41, a rolling spindle 62 disposed parallel to the tail stock 41 through bearings 63, a driven gear 64 disposed in the rolling spindle 62 and engaging with the synchronizing gear 42, and a rolling die 65.

Next, the motions of this apparatus for flow forming 7 will be explained.

As the chuck unit 5 is made to advance, the receiving die 43 of the tail stock unit 4, disposed face to face with the chuck unit 4, and the clamp die 52 of the chuck unit 5 hold the intermediate product W7. The movable carriage 61 of the rolling die unit 6 traverses against the tail stock 41 to engage the driven gear 64 with the synchronizing gear 42 and engage the rolling die 65 with the helical teeth Ra, rough-formed at the speed gear section Pa of the intermediate product W7.

The intermediate product W7 and the chuck unit 5 are made to rotate by turning of the tail stock 41. In this case, the tail stock 41 preferably makes normal rotation and reverse rotation alternately at prescribed cycles.

On the other hand, the rotation of the tail stock 41 is transmitted, through the synchronizing gear 42, the driven gear 64 and the rolling spindle 62, to the rolling die 65, and this rolling die 65 turns in synchronization with the synchronizing gear 42.

As a result, the intermediate product W7, which is engaged with the rolling die 65, is turned by the tail stock 41. While the intermediate product W7 is turning with the rolling die 65, the helical teeth Ra are finish formed into helical teeth Ga by forging with the rolling die 65.

To take out the intermediate product W8 on which helical teeth Ga are formed, the chuck receiving base 51 is made to retreat to cancel holding of the intermediate product W8 by the receiving die 43 and the clamp die 52. The intermediate product W8 fit in the clamp die 52 is inclined by making the stripper 53 protrude by means of the rod 56.

The speed gear and the manufacturing method and apparatus according to the present invention have so far been explained, by taking, as an example, the speed gear W of the form as indicated in FIGS. 11(A) and 11(B), realized in a way to form helical teeth Ga as speed gear teeth at the speed gear section Pa. The object of the present invention is not restricted to a speed gear of this form, but may be modified as required within a range not deviating from its purport.

To be more concrete, the speed gear W forming the subject of the present invention includes a speed gear with flat teeth, in addition to speed gear having helical teeth, as speed gear teeth Ga, and further includes a speed gear having crowning Ca on the tooth flank of the speed gear with Ga as shown in FIGS. 10(C) and 10(D) and also includes those not having crowning Ca, as a matter of course.

In this case, by suitably selecting the shape of the rolling die 65 of the apparatus for flow forming 7, when finish forming, by forging with rolling die 65, speed gear teeth Ra, rough-formed at the speed gear section Pa of the intermediate product W7, into speed gear teeth Ga, it is possible to form crowning Ca on the tooth flank of the teth of speed gear Ga at the same time.

Moreover, a speed gear W forming the subject of the present invention includes speed gear in which the tip diameter Db of the back tapered involute spline Gb formed on the clutch spline section is larger than the root diameter Da of the speed gear teeth Ga formed on the speed gear section Pa as indicated in FIG. 10(B). The clearance t of a groove Na formed between the speed gear section Pa and the clutch spline section Pb is no more than 2 mm, as also in a speed gear in which a partition Nb is formed between the speed gear section Pa and the clutch spline section Pb, as shown in FIG. 10(C), etc., which were difficult to work within a method of forming speed gear teeth Ga on the speed gear section Pa by machining such as hobbing, etc. Speed gear in which the clearance t of the groove Na formed at the speed gear section Pa and the clutch spline section Pb is larger than 2 mm, as shown in FIG. 10(A), are also included, naturally.

What is claimed is:

1. A manufacturing apparatus of speed gear, comprising a collet chuck and a male cone to be inserted in the collet chuck, so as to expand the diameter of the collet chuck, for holding a shaft hole pierced at a center of a work gear, a tail stock for turning the work gear, through the collet chuck, around its shaft hole, a synchronizing gear disposed in the tail stock that turns together with the tail stock, a driven gear engaging with the synchronizing gear, and a rolling spindle on which are disposed rolling dies, wherein the work gear has speed gear teeth, rough-formed in advance on a speed gear section of the work gear, finish formed by the rolling dies turning in synchronization with the work gear, while turning the work gear around the shaft hole, through the synchronizing and driven gears.

2. A manufacturing apparatus of speed gear as defined in claim 1, wherein said rolling dies are constructed in a way to perform finish forming of helical teeth rough-formed in advance at the section of speed gear of the work gear.

3. A manufacturing apparatus of speed gear as defined in claim 1, wherein said rolling dies are constructed in a way to also perform crowning at the tooth flank of the speed gear teeth rough-formed in advance at the speed gear section of the work gear.

4. A manufacturing apparatus of a speed gear for finish forming of speed gear teeth that have been rough-formed in advance on a work gear, said manufacturing apparatus comprising:

a collet chuck having a male cone to be inserted in said collet chuck for holding a shaft hole pierced through the center of the work gear by expanding the diameter of said collet chuck;

a tail stock connected with said collet chuck for turning the work gear through said collet chuck;

a synchronizing gear disposed with said tail stock so as to turn together with said tail stock;

a driven gear for engagement with said synchronizing gear;

a rolling spindle arranged to be rotated by said driven gear; and rolling dies, disposed with said rolling spindle so as to be turned by said rolling spindle, for engagement with the speed gear teeth that have been rough-formed in advance on the work gear, such that when the work gear is held by said collet chuck and turned by the tail stock, and said driven gear engages with said synchronizing gear, said rolling dies are engaged with the speed gear teeth of the work gear and turned in synchronization with the work gear through said synchronizing and driven gears for finish forming of the speed gear teeth.

5. The manufacturing apparatus of claim 4, wherein said rolling dies are constructed so as to perform finish forming of helical speed gear teeth that have been rough-formed in advance at the speed gear section of the work gear.

6. The manufacturing apparatus of claim 4, wherein said rolling dies are constructed so as to also perform crowning at tooth flanks of the speed gear teeth that have been rough-formed in advance at the speed gear section of th work gear.

* * * * *